United States Patent [19]
MacDonald

[11] 3,917,109
[45] Nov. 4, 1975

[54] EVAPORATIVE EMISSION CONTROLS
[75] Inventor: Donald C. MacDonald, Rochester, Mich.
[73] Assignee: Chrysler Corporation, Highland Park, Mich.
[22] Filed: May 2, 1974
[21] Appl. No.: 466,120

[52] U.S. Cl............ 220/85 VS; 137/587; 220/86 R
[51] Int. Cl.² ......................................... B65D 25/00
[58] Field of Search ......... 220/86 R, 85 VS, 85 VR; 137/587, 583; 55/385; 141/44, 45, 325, 226, 52, 53

[56] References Cited
UNITED STATES PATENTS

| | | | |
|---|---|---|---|
| 1,766,916 | 6/1930 | MacLiven | 220/86 R |
| 1,839,809 | 1/1932 | Smith | 220/86 R |
| 1,841,691 | 1/1932 | Wilson | 220/85 VR |
| 3,643,690 | 2/1972 | Sanai | 220/86 R |
| 3,672,537 | 6/1972 | Kitzner | 220/85 VR |
| 3,771,690 | 11/1973 | Hunter | 220/85 VR |
| 3,800,978 | 4/1974 | Sigwald | 220/85 VS |
| 3,804,291 | 4/1974 | Fricken | 220/85 R |
| 3,817,421 | 6/1974 | Andres | 220/86 R |

*Primary Examiner*—William I. Price
*Assistant Examiner*—Allan N. Shoap
*Attorney, Agent, or Firm*—Talburtt & Baldwin

[57] ABSTRACT

A domed fuel tank carrying a vapor-liquid separator in the domed portion with a single vent conduit extending from the vapor-liquid separator to the exterior of the tank.

1 Claim, 5 Drawing Figures

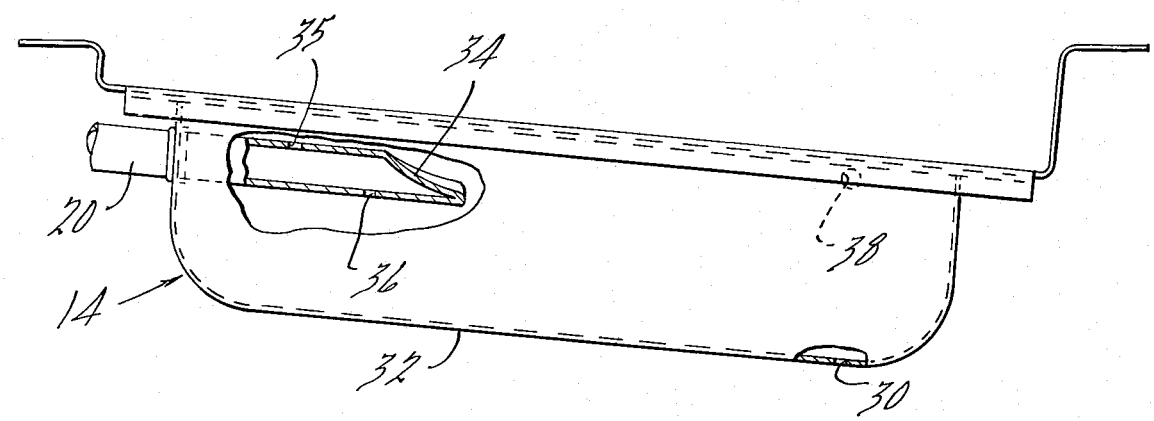
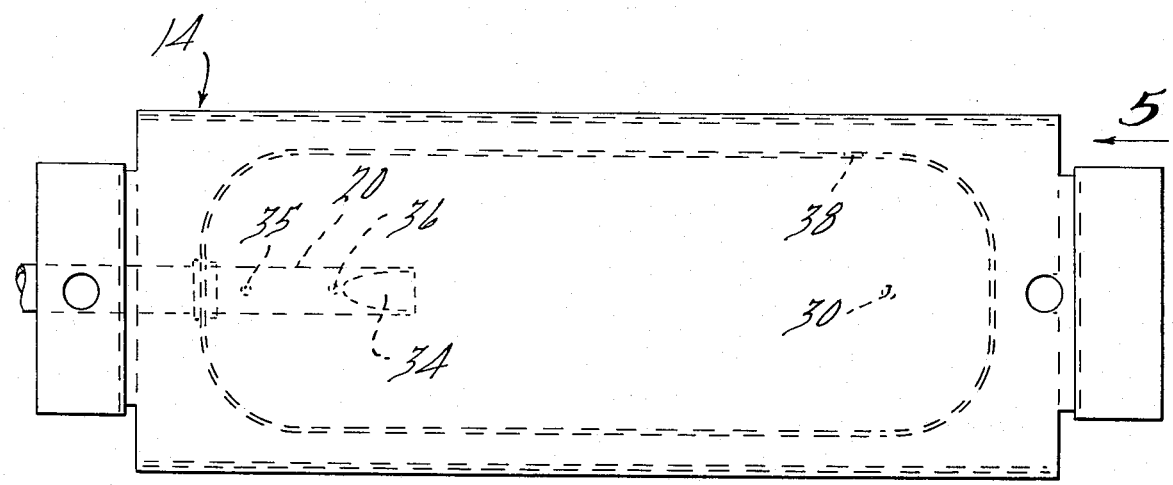
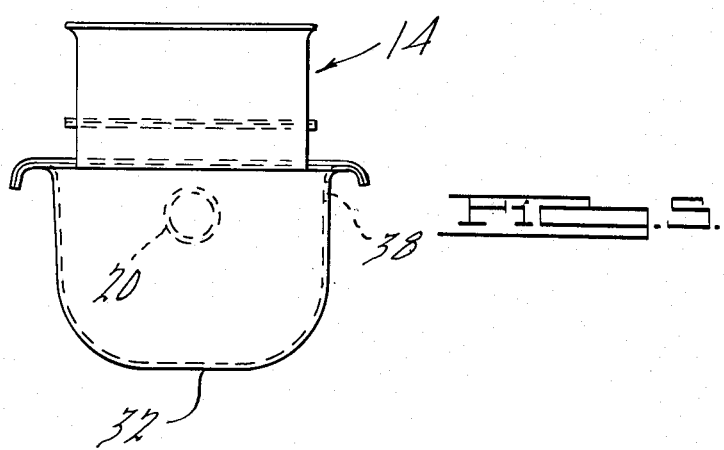

EVAPORATIVE EMISSION CONTROLS

BACKGROUND OF THE INVENTION

One source of hydrocarbon emissions from motor vehicles is the fuel vapor escaping from the fuel system. Specifically, significant quantities of gasoline vapors have heretofore escaped from external vents of the fuel tank of many motor vehicles. There have been attempts to contain such emissions by discontinuing the practice of venting motor vehicle fuel tanks directly to the atmosphere.

Today, most motor vehicles include a fuel tank venting system for collecting and storing fuel vapors and forwarding them to the engine when it is operating. The inter-connection of the fuel tank vapor venting system between the fuel tank and the engine can result in liquid fuel carryover. This is undesirable. A liquid-vapor separator means of some sort is therefore necessary to provide for liquid-vapor separation with the vapor proceeding to the engine and the liquid fuel draining back into the fuel tank.

Factors which contribute to liquid fuel carryover are tank pressure and maneuvering inertia forces. Attitude of the vehicle and liquid thermal expansion also contribute to liquid fuel carryover.

Some of the currently more or less typical venting and liquid-vapor separator arrangements are shown in U.S. Pat. No. 3,542,239 which issued Nov. 24, 1970 to one Aale Latvala; U.S. Pat. No. 3,517,654 which issued June 30, 1970 to J. O. Sarto et al; U.S. Pat. No. 3,687,335 which issued Aug. 29, 1972 to William A. Hunter; U.S. Pat. No. 3,698,160 which issued Oct. 17, 1972 to William A. Hunter; and U.S. Pat. No. 3,771,690 which issued Nov. 13, 1973 to William A. Hunter. These patents are merely cited as being illustrative of some of the various liquid vapor separator arrangements and venting arrangements suggested in the art. The list of prior art presented here is by no means complete.

Arrangements which are simplified both in structure and function are always deemed desirable. The present invention is believed to be a step in this direction.

SUMMARY OF THE INVENTION

This invention provides a fuel tank for motor vehicles which is adapted to provide an expansion space for liquid and vapor fuel and to contain a liquid-vapor separator and single vent line at sufficient height above the fuel to prevent liquid fuel carryover. This single vent line communicates between the interior of the liquid-vapor separator and the exterior of the fuel tank. The vent line may of course extend to any appropriate vapor receiving means on the motor vehicle.

BRIEF DESCRIPTION OF THE DRAWINGS

FIGS. 3, 4 and 5 are side and top plan views and an end elevational view respectively showing the liquid-vapor separator structure in detail.

DESCRIPTION OF THE PREFERRED EMBODIMENT

Figure 1:
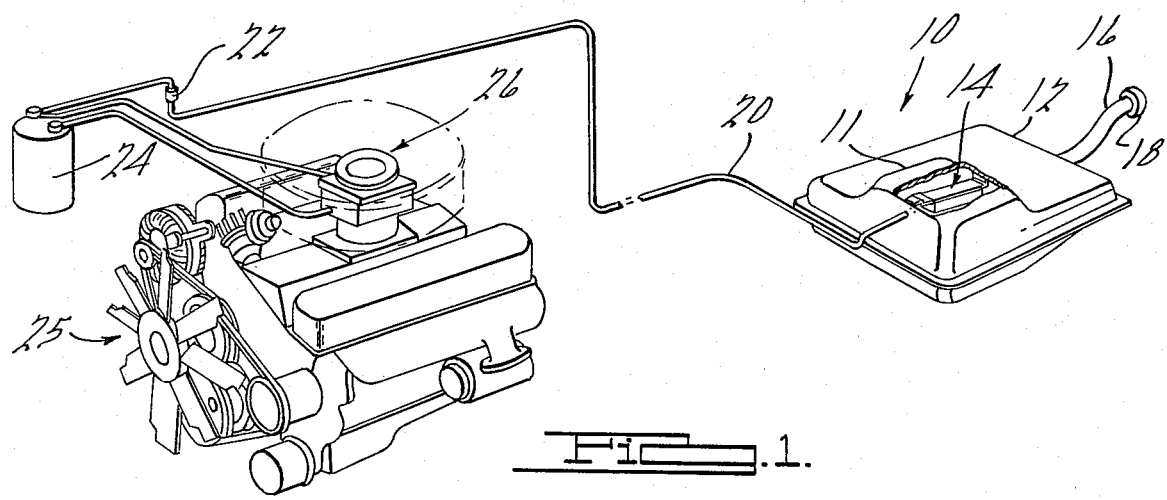
FIG. 1 is a perspective schematic view of a motor vehicle engine and a domed fuel tank according to the preferred embodiment of the invention.

Referring now to the drawing, the figures show an evaporative control system in accordance with this invention including a sealed fuel tank 10 having a generally rectangular shape and including an expansion space provided in the preferred embodiment by a domed portion 11 which is raised above the major upper surface portion 12 of the tank. Domed portion 11 contains a liquid-vapor separator 14. Fuel tank 10 also includes a filler pipe 16 which is sealed with a pressure-vacuum relief filler cap 18. Such caps are well known. Cap 18 may for example be of a type which provides vacuum relief at 4–8 inches of water and pressure relief at 25–35 inches of water. A vent line conduit 20 communicates between the interior of liquid-vapor separator 14 and the exterior of the tank as shown in the Figures. Vent line conduit 20 may include an overfill limiting means 22 which may be a limiting valve of the type shown in U.S. Pat. No. 3,771,690, previously referred to above. In the arrangement shown in FIG. 1 vent conduit 20 extends to a charcoal cannister 24 and ultimately to an engine 25 via connections through a carburetor, indicated generally at 26. A vent system is thus provided which minimizes the possibility of vapor leakage to the atmosphere.

Figure 2:
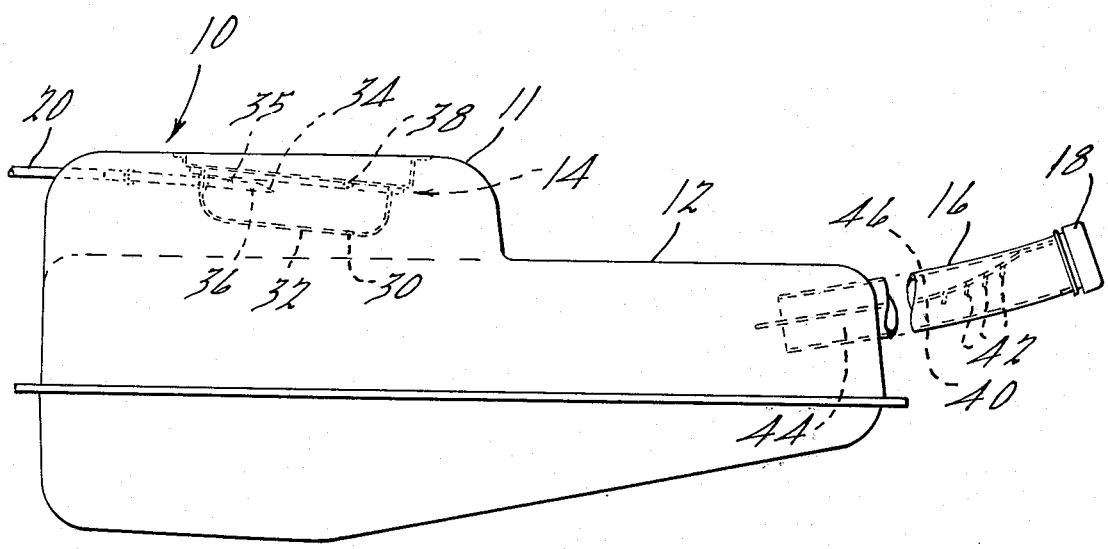
FIG. 2 is a side elevation of the domed fuel tank of FIG. 1 showing the position of the liquid-vapor separator in the expansive space provided by the domed portion of the tank, the single vent conduit extending therefrom and the filler pipe for the tank.

Liquid-vapor separator 14 is mounted in domed portion 11 of fuel tank 10 as best shown in FIG. 2. Separator 14 has an opening 38 in an upper portion of a side to allow fuel vapors from fuel tank 10 to enter separator 14 and gain access to vent conduit 20. As can be seen from FIGS. 3 through 5, liquid-vapor separator 14 is an enclosed container having top, bottom, and sides, respectively. It is mounted in the expansion space provided by dome 11 such that its floor 32 has a downward slope toward drain opening 30 to facilitate drainage of liquid fuel back into the main body of fuel tank 10. Preferably, conduit 20, at least that portion interior to liquid-vapor separator 14 will also have a downward slope to facilitate liquid drainage therefrom through opening 36 into separator 14 with air admitted through opening 35 to facilitate drainage from the conduit. It should be noted that the interior end 34 of conduit 20 is closed to prevent entrance of liquid splash into the conduit. The relatively small openings 35 and 36 allow fuel vapors to exit tank 10 and separator 14 by entering conduit 20 in order to vent and relief pressure buildup in tank 10. The openings also allow air to enter separator 14 and tank 10 from conduit 20 to relieve vacuum buildup.

Not only does separator 14 serve as a locus for the separation of vapors from liquid fuel and the collection of those vapors by flow thereof into conduit 20, it also acts as a baffle in the fuel tank to prevent liquid carryover by preventing sloshing fuel from entering vent conduit 20.

It is necessary to arrange the filler pipe 16 and vapor separator 14 such, relative to tank 10 and to each other, that a normal fill level for fuel in the tank is low enough that fuel will not carry over into conduit 20 when the tank is full. For example, this may be accomplished by providing filler pipe 16 with a baffle 40 having a series of louvers 42 at the top thereof. When fuel is pumped into tank 10 it flows through filler pipe 16 below baffle 40 at 44. Air flows from tank 10 through filler pipe 16 at 46 and exits through louvers 42 and out the top of the filler pipe to atmosphere. Filler pipe 16 is so arranged as to have a head of fuel when the tank is substantially full which does not cause a fuel level in the tank higher than the opening 36 in conduit 20, as for example, when the vehicle is positioned at an 18° or 35% grade fore and aft.

What is claimed is:

1. A motor vehicle fuel tank assembly comprising:

a tank including an integral domed portion in its top for accommodating venting and fuel expansion, a filler tube extending outwardly from the fuel tank, the tube having an opening positioned at substantially the same level as the maximum fuel level of the tank thereby providing a vapor space in the domed portion of the tank at a certain head of fuel in the filler tube when the tank is substantially full to a level immediately below the domed portion, a single vapor vent conduit extending into the domed portion for receiving fuel vapor, and vapor liquid separator means positioned only in the domed portion not extending downwardly into the tank proper, the separator means consisting of elongated enclosure means having top, bottom and sides, the enclosure means being positioned lengthwise in the domed portion and adjacent the inner top of the domed portion with one end thereof lower than the other to facilitate liquid drainage therefrom, and being connected at the other end to the vapor vent conduit for collecting fuel vapors which subsequently exit through the conduit from the enclosure, a relatively small opening in the bottom of the enclosure means at the lower end thereof for liquid fuel drainage, the size of the opening being such as to substantially prohibit splashing liquid fuel in the tank proper from entering the enclosure means, and another relatively small opening in an upper portion of one of the sides of the enclosure means for communicating with the interior of the fuel tank and allowing vapor to flow between the enclosure means and the domed portion of the fuel tank thereby providing access for vapor to the vapor vent conduit via the enclosure means, the size of the opening being such as to substantially prohibit splashing liquid fuel from entering the enclosure means, and the vapor conduit having an end section thereof extending downwardly into the enclosure means to facilitate drainage of liquid fuel therefrom, the downwardly extending section having a closed end and a pair of spaced openings along the length thereof.

* * * * *